UNITED STATES PATENT OFFICE.

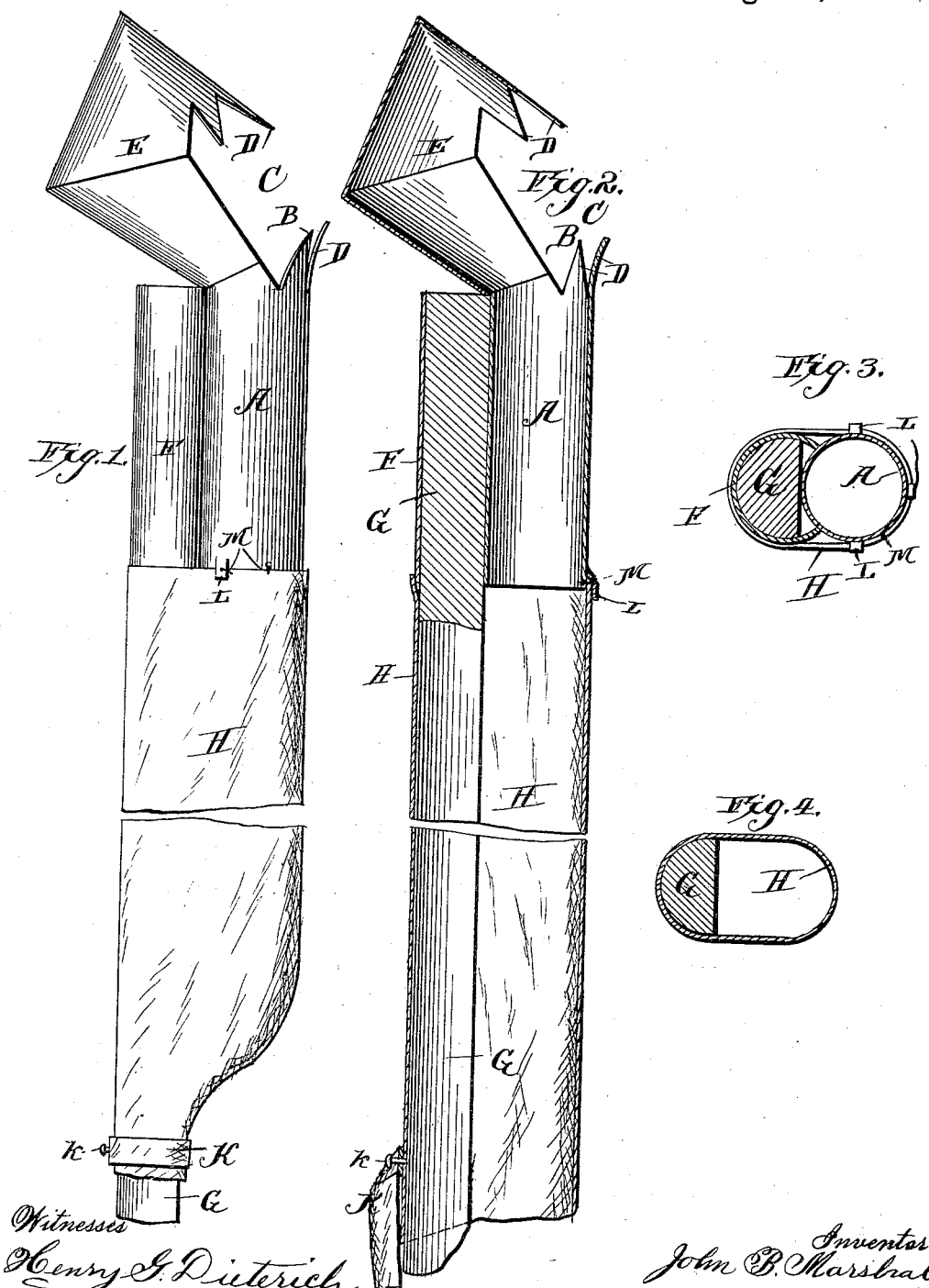

JOHN BARTON MARSHALL, OF SUNNY SIDE, NEW JERSEY.

FRUIT-PICKER.

SPECIFICATION forming part of Letters Patent No. 409,296, dated August 20, 1889.

Application filed March 22, 1889. Serial No. 304,256. (No model.)

*To all whom it may concern:*

Be it known that I, JOHN BARTON MARSHALL, a citizen of the United States, residing at Sunny Side, in the county of Hunterdon and State of New Jersey, have invented new and useful Improvements in Fruit-Pickers, of which the following is a specification.

The invention relates to improvements in fruit-pickers; and it consists in a certain novel construction and combination of devices, fully described hereinafter in connection with the drawings and specifically pointed out in the claims.

In the drawings, Figure 1 is a view of the improved picker in the operative position. Fig. 2 is a vertical central sectional view of the same. Fig. 3 is a transverse sectional view of the conductor-tube and the sheath or socket in which the upper end of the pole or handle is fitted. Fig. 4 is a similar view of the flexible chute.

Referring to the drawings, A designates a conductor-tube, to the upper end of which is affixed a receiver or detacher B, having a mouth C in the side through which the fruit is inserted. This mouth is provided at its upper and lower edges with the V-shaped detaching teeth or points D D, which are adapted to engage the stem of the fruit (either by drawing the picker down or pushing it up) and thereby detach the latter. The stem of the fruit passes between the adjacent convergent edges of the teeth or points and is cut thereby.

The receiver or detacher B is tipped slightly and its mouth is formed in the front or upper side, so as to enable the fruit to be readily inserted. The receiver is provided with a conical cap or top E.

F represents a sheath or socket formed at the side of the conductor-tube, into which the upper end of the pole or handle G fits, the said pole or handle being of any preferred length to enable the operator to reach fruit on the limbs of trees.

H represents a flexible chute, the upper end of which is attached to the lower end of the conductor-tube, and this chute incloses the handle and is secured to the outer side of the latter. The inner side of the handle is flattened, as shown, so as to offer no obstruction to the passage of the fruit through the chute.

The operation of the improved fruit-picker will be readily understood. The fruit is caused to enter the mouth of the receiver or detacher, and when the latter is either drawn downward or pushed upward to cause the detaching teeth or points to engage the stem and thereby detach the fruit, when the latter will pass downward through the conductor-tube and the chute and drop on the ground or into a basket or sack provided for the purpose. The operator may stand on a ladder with a basket or sack hung in front of him in any convenient manner, so that as the fruit is detached it passes down the chute and falls into the basket or sack.

K designates a strap which is attached at one end to the pole or handle near the lower end of the chute, and is adapted to be passed around the chute and secured on the headed stud $k$, to contract and thereby stop up the lower end of the chute, so as to prevent the escape of the fruit from the latter, and thereby obviate the necessity of a basket or sack.

The conductor-tube is provided at its lower end with the upset ears L L, under which the upper edge of the chute is engaged, the said ears being pressed down into place to hold the chute in place. The ears are also provided with perforations, through which stitches M may be taken to more securely fasten the chute thereto.

Having thus described my invention, I claim—

1. In a fruit-picker, the combination of the conductor-tube, the receiver affixed thereto and provided with an opening in its side having serrated upper and lower edges, the chute secured to the conductor-tube, and the handle secured to one side of said tube, as set forth.

2. The combination of the chute and the conductor-tube, having the tongues L engaging the upper edge of the chute to secure it to the conductor-tube, as set forth.

In testimony that I claim the foregoing as my own I have hereto affixed my signature in presence of two witnesses.

JOHN BARTON MARSHALL.

Witnesses:
 GEO. A. BELL,
 JAMES HOFF.